(12) United States Patent
Ghaffari et al.

(10) Patent No.: US 11,148,646 B2
(45) Date of Patent: Oct. 19, 2021

(54) RETRACTABLE PEDAL ASSEMBLY FOR A VEHICLE

(71) Applicant: GM Global Technology Operations LLC, Detroit, MI (US)

(72) Inventors: Ali Ghaffari, Rochester, MI (US); Steven J. Weber, Mount Clemens, MI (US); Tomasz R. Warzecha, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 343 days.

(21) Appl. No.: 16/373,784

(22) Filed: Apr. 3, 2019

(65) Prior Publication Data

US 2020/0317166 A1 Oct. 8, 2020

(51) Int. Cl.
| | |
|---|---|
| *G05G 1/40* | (2008.04) |
| *B60T 7/06* | (2006.01) |
| *B60K 26/02* | (2006.01) |
| *G05D 1/00* | (2006.01) |

(52) U.S. Cl.
CPC ........... *B60T 7/06* (2013.01); *B60K 26/02* (2013.01); *G05D 1/0061* (2013.01); *B60K 2026/026* (2013.01)

(58) Field of Classification Search
CPC .......... B60R 21/09; G05G 1/40; G05G 1/405; B60K 2026/026
See application file for complete search history.

(56) References Cited

U.S. PATENT DOCUMENTS

| | | | | |
|---|---|---|---|---|
| 3,048,980 A | * | 8/1962 | Cousino | B60T 7/04 60/594 |
| 3,861,236 A | * | 1/1975 | Ramage | G05G 1/46 74/512 |
| 6,182,525 B1 | * | 2/2001 | Bowers | B60K 20/02 180/274 |
| 6,298,745 B1 | * | 10/2001 | Rixon | B60K 26/021 74/512 |
| 6,364,047 B1 | * | 4/2002 | Bortolon | B60K 23/02 180/334 |
| 6,367,886 B1 | * | 4/2002 | Shaw | B60T 7/06 303/3 |
| 10,906,514 B1 | * | 2/2021 | Kim | G05G 1/40 |

(Continued)

*Primary Examiner* — Richard W Ridley
*Assistant Examiner* — Brian J McGovern
(74) *Attorney, Agent, or Firm* — Quinn IP Law

(57) ABSTRACT

An automotive vehicle includes a body having a passenger compartment and a pedal assembly disposed within the passenger compartment. The pedal assembly includes a brake pedal emulator housing and at least one pedal interface coupled to the housing. The vehicle also includes an actuator operably coupled to the brake pedal emulator housing. The actuator is configured to selectively move the housing and the pedal interface between a first position and a second position with respect to the passenger compartment. The vehicle further includes at least one controller in communication with the actuator. The controller is configured to, in response to satisfaction of a first operating condition, control the actuator to move the housing and the pedal interface to the first position, and, in response to satisfaction of a second operating condition, control the actuator to move the housing and the pedal interface to the second position.

13 Claims, 6 Drawing Sheets

(56) References Cited

U.S. PATENT DOCUMENTS

| | | | |
|---|---|---|---|
| 2007/0137397 A1* | 6/2007 | Choi | G05G 1/36 74/512 |
| 2009/0038431 A1* | 2/2009 | Willemsen | G05G 25/02 74/512 |
| 2009/0223319 A1* | 9/2009 | Choi | G05G 1/36 74/512 |
| 2011/0132134 A1* | 6/2011 | Kim | G05G 1/30 74/514 |
| 2012/0132028 A1* | 5/2012 | Kim | G05G 1/405 74/512 |
| 2017/0225570 A1* | 8/2017 | El Aile | B60R 7/06 |
| 2018/0001875 A1* | 1/2018 | Houtman | B60T 11/18 |
| 2020/0257329 A1* | 8/2020 | Kihara | G05G 1/40 |
| 2020/0317167 A1* | 10/2020 | Ghaffari | B60T 7/06 |
| 2021/0004040 A1* | 1/2021 | Dohmen | G05G 1/38 |
| 2021/0109560 A1* | 4/2021 | Ford | B60K 26/02 |

\* cited by examiner

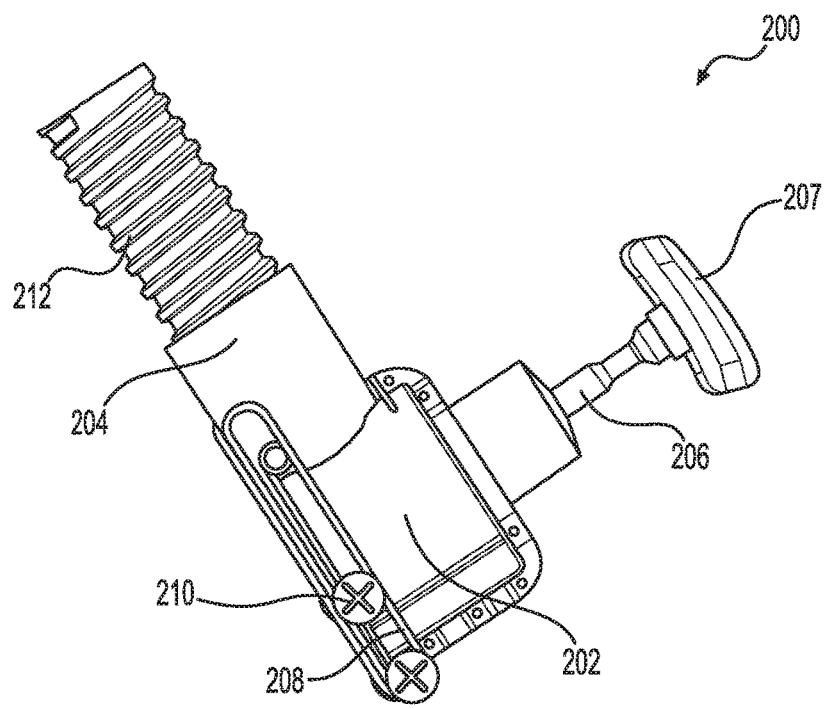
FIG. 4
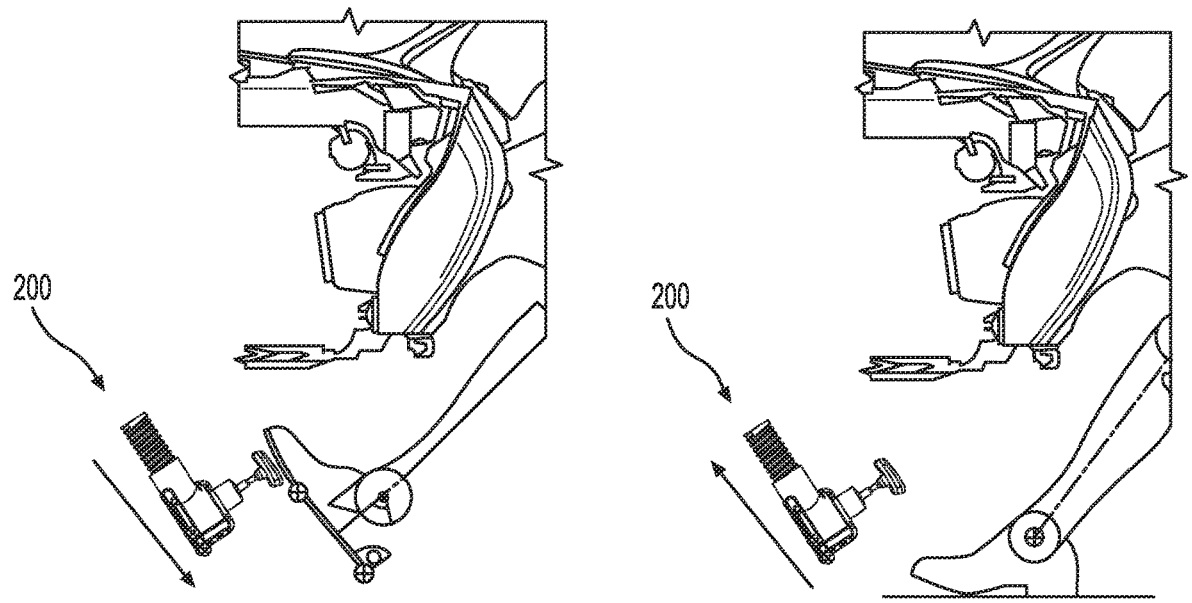
FIG. 5A
FIG. 5B

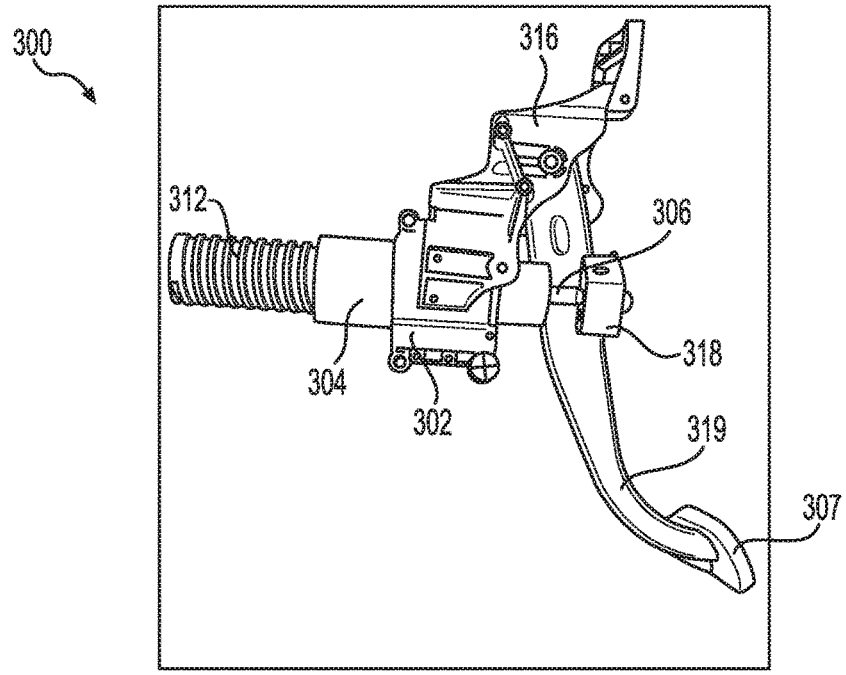
FIG. 6
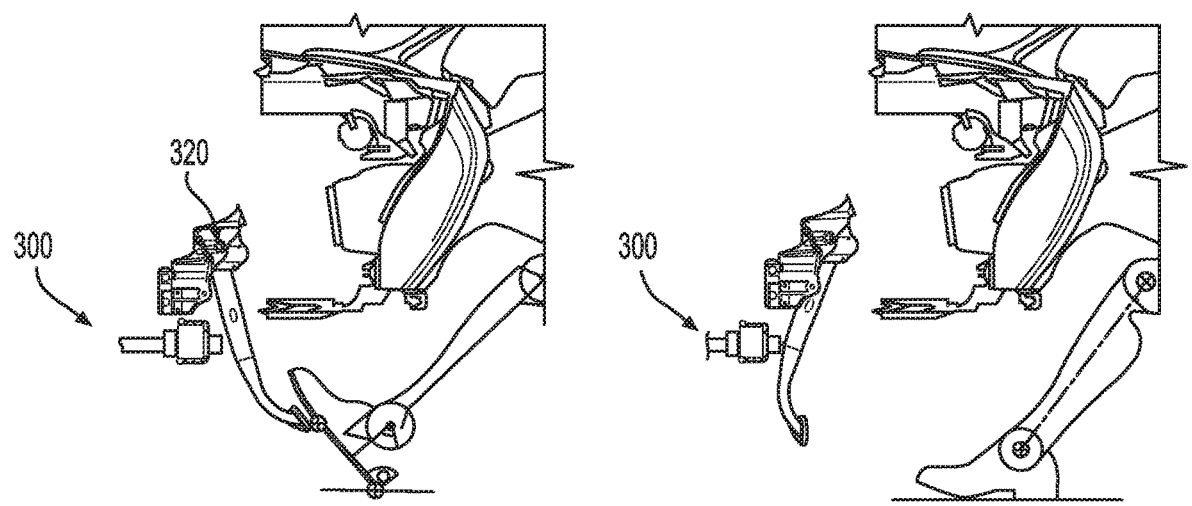
FIG. 7A
FIG. 7B

RETRACTABLE PEDAL ASSEMBLY FOR A VEHICLE

INTRODUCTION

The present disclosure relates generally to retractable and stowable pedal assemblies.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

Embodiments according to the present disclosure provide a number of advantages. For example, the present disclosure provides a system and method for providing control interfaces to a vehicle operator when useful and moving such control interfaces out of the operator's way when unnecessary, thereby avoiding unintentional control inputs and increasing occupant comfort.

An automotive vehicle according to the present disclosure includes a body having a passenger compartment and a pedal assembly disposed within the passenger compartment. The pedal assembly includes a brake pedal emulator housing and at least one pedal interface coupled to the brake pedal emulator housing and the at least one pedal interface is actuatable by an occupant. The vehicle also includes an actuator operably coupled to the brake pedal emulator housing. The actuator is configured to selectively move the brake pedal emulator housing and the pedal interface between a first position with respect to the passenger compartment and a second position with respect to the passenger compartment. The vehicle further includes at least one controller in communication with the actuator. The at least one controller is configured to, in response to satisfaction of a first operating condition, control the actuator to move the brake pedal emulator housing and the pedal interface to the first position, and, in response to satisfaction of a second operating condition, control the actuator to move the brake pedal emulator housing and the pedal interface to the second position.

In some aspects, the vehicle further includes a push rod coupled to the pedal interface and operatively coupled to the actuator. The actuator includes a rotatable threaded member and the brake pedal emulator housing includes a receiving member rotationally engaged with the threaded member such that rotation of the threaded member drives translation of the brake pedal emulator housing.

In some aspects, the vehicle further includes a support member coupled to an interior portion of the passenger compartment and the pedal assembly further includes a pedal arm having a first end rotatably coupled to the support member and a second end opposite the first end. Translation of the brake pedal emulator housing rotates the pedal arm relative to the support member.

In some aspects, the actuator is linearly oriented with the push rod.

In some aspects, the actuator is orthogonally oriented with the push rod.

In some aspects, the vehicle further includes a rail coupled to an interior portion of the passenger compartment and the brake pedal emulator housing is slidably coupled to the rail.

In some aspects, the first operating condition comprises an automated driving system not controlling vehicle driving behavior and wherein the second operating condition comprises the automated driving system controlling vehicle driving behavior.

In some aspects, the first position of the pedal interface is a deployed position and the second position of the pedal interface is a stowed position.

A pedal assembly for a vehicle according to the present disclosure includes a track, a brake pedal emulator housing slidably coupled to the track, and at least one pedal interface operably coupled to the brake pedal emulator housing and actuatable by an occupant. The pedal assembly also includes an actuator operably coupled to the brake pedal emulator housing. The actuator is configured to selectively move the brake pedal emulator housing and the pedal interface between a deployed position with respect to the track and a stowed position with respect to the track. The actuator is further configured to actuate the brake pedal emulator housing and the pedal interface to the deployed position in response to a deploy command from a controller and to actuate the brake pedal emulator housing and the pedal interface to the stowed position in response to a stow command from the controller.

In some aspects, the pedal assembly further includes a push rod coupled to the pedal interface and operatively coupled to the actuator. The actuator includes a rotatable threaded member and the brake pedal emulator housing includes a receiving member rotationally engaged with the threaded member such that rotation of the threaded member drives translation of the brake pedal emulator housing.

In some aspects, the controller is configured to generate the deploy command in response to satisfaction of a first operating condition and to generate the stow command in response to satisfaction of a second operating condition.

In some aspects, the first operating condition comprises an automated driving system not controlling vehicle driving behavior and the second operating condition comprises the automated driving system controlling vehicle driving behavior.

In some aspects, the pedal assembly further includes a support member and the pedal assembly further comprises a pedal arm having a first end rotatably coupled to the support member and a second end opposite the first end and wherein translation of the brake pedal emulator housing rotates the pedal arm relative to the support member.

In some aspects, translation of the brake pedal emulator housing rotates the pedal arm such that the pedal arm and the brake pedal emulator housing move in the same direction between the deployed position and the stowed position.

In some aspects, translation of the brake pedal emulator housing rotates the pedal arm such that the pedal arm and the brake pedal emulator housing move in opposite directions between the deployed position and the stowed position.

In some aspects, the actuator is linearly oriented with the push rod.

In some aspects, the actuator is orthogonally oriented with the push rod.

A method of controlling an automotive vehicle according to the present disclosure includes providing a vehicle with a first actuator configured to control vehicle acceleration or braking, a controller configured to selectively control the first actuator in an autonomous mode according to an automated driving system, a pedal assembly having a brake pedal emulator housing, a push rod operably coupled to the brake pedal emulator housing, and at least one pedal interface operably coupled to the push rod, and a second actuator operably coupled to the brake pedal emulator housing. The method also includes, in response to the controller controlling the first actuator in the autonomous mode, automatically controlling the second actuator, via the controller, to actuate the brake pedal emulator housing and the pedal interface to a stowed position. The method further includes, in response to the controller not controlling the first actuator in the autonomous mode, automatically controlling the second actuator, via the controller, to actuate the brake pedal emulator housing and the pedal interface to a deployed position.

The above and other advantages and features of the present disclosure will be apparent from the following detailed description of the preferred embodiments when taken in connection with the accompanying drawings.

BRIEF DESCRIPTION OF THE DRAWINGS

The present disclosure will be described in conjunction with the following figures, wherein like numerals denote like elements.

FIG. 4 is a schematic view of a pedal assembly, according to a second embodiment of the present disclosure.

FIGS. 5A and 5B are schematic views of a vehicle, according to an embodiment.

FIG. 6 is a schematic view of a pedal assembly, according to a third embodiment of the present disclosure.

FIGS. 7A and 7B are schematic views of a vehicle, according to an embodiment.

Figure 1:
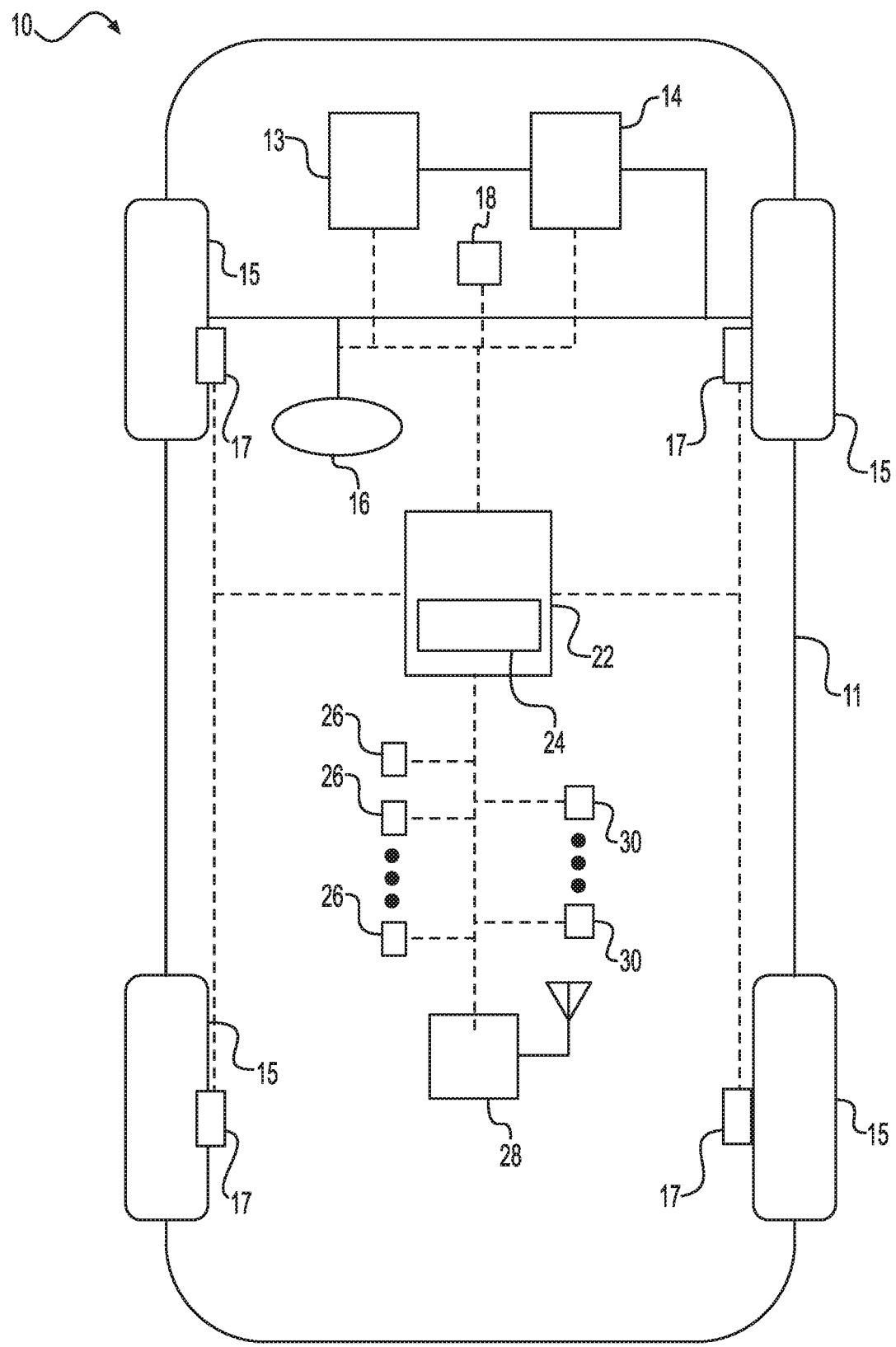
FIG. 1 is a schematic diagram of a vehicle according to an embodiment of the present disclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first" "second," "third," and so on may be used to describe separate components. Such terminology may include the words specifically mentioned above, derivatives thereof, and words of similar import.

FIG. 1 schematically illustrates an automotive vehicle 10 according to the present disclosure. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used. The vehicle 10 includes a propulsion system 13, which may in various embodiments include an internal combustion engine, an electric machine such as a traction motor, and/or a fuel cell propulsion system.

The vehicle 10 generally includes a body 11 and wheels 15. The body 11 encloses the other components of the vehicle 10 and also defines a passenger compartment. The wheels 15 are each rotationally coupled to the body 11 near a respective corner of the body 11.

The vehicle 10 also includes a transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission.

The vehicle 10 additionally includes a steering system 16. While depicted as including a steering wheel for illustrative purposes, in some embodiments contemplated within the scope of the present disclosure, the steering system 16 may not include a steering wheel.

The vehicle 10 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems. In various embodiments, the braking system includes a primary brake actuator and a secondary brake actuator configured to create torque at each wheel brake 17 by various methods including, for example and without limitation, electromechanical hydraulic pressure, electromechanical clamping force and/or other braking methods. In some embodiments, the primary and secondary brake actuators are in electronic communication with a brake control module. In some embodiments, each of the primary and secondary brake actuators are in communication with a single brake control module. In other embodiments, the primary and secondary brake actuators are each in electronic communication with a brake control module. In some embodiments, the brake control module includes an electronic brake controller.

The vehicle 10 additionally includes at least one pedal assembly 18. In an exemplary embodiment, the at least one pedal assembly 18 includes a first pedal, which may be referred to as an accelerator pedal, for controlling the propulsion system 13 and a second pedal, which may be referred to as a brake pedal, for controlling the wheel brakes 17.

In various embodiments, the vehicle 10 also includes a navigation system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, wheel brakes 17 via the brake control module, and pedal assembly 18 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 via one or more brake control modules to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

In the illustrated embodiment, the vehicle 10 is a so-called dual mode vehicle, capable of being operated by a human driver or by the ADS 24. When the vehicle 10 is under the control of a human driver, control interfaces such as a steering wheel and the at least one pedal assembly 18 should be accessible by the human driver. However, when the vehicle 10 is under the control of the ADS 24, human operation of such control interfaces may be unnecessary, undesirable, or both.

In the embodiments of the pedal assembly discussed herein, a movable brake pedal emulator (BPE) enables the pedal arm to move between a deployed position and a stowed position. Embodiments of the present disclosure transfer force to the BPE in multiple directions to allow for greater packaging flexibility of the pedal assembly in the vehicle.

Figure 2:
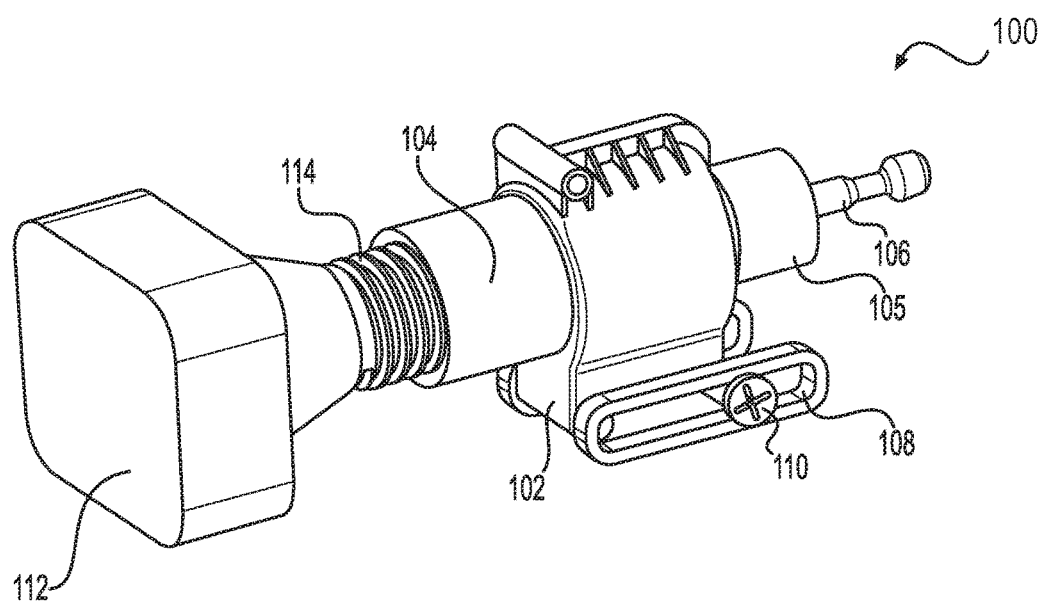
FIG. 2 is a schematic view of a pedal assembly, according to a first embodiment of the present disclosure.

Referring now to FIG. 2, a pedal assembly 100 according to an embodiment of the present disclosure is illustrated. The pedal assembly 100 includes a brake pedal emulator (BPE) housing 102 enclosing a BPE, a receiving member 104, a push rod connection member 105, a push rod 106, a rail or track 108, and a guide member 110. A pedal interface is coupled to the push rod 106. The push rod 106 is configured to translate relative to the BPE housing 102 when the pedal interface is depressed by an operator. In an exemplary embodiment, the BPE housing 102 is provided with at least one rail or track 108 along which the BPE housing 102 may slide. In some embodiments, the guide member 110 is coupled to the BPE housing 102 such that the guide member 110 travels along the rail or track 108 to guide the linear translation of the BPE housing 102 between a deployed position and a stowed position. The rail or track 108 is coupled to an interior portion of the passenger compartment of the vehicle.

The pedal assembly 100 also includes at least one actuator 112. In various embodiments, the actuator 112 may be physically secured to an exterior or interior portion of the BPE housing 102 such as, for example, via a threaded member 114 received within the receiving member 104. In an exemplary embodiment, rotation of the threaded member 114 transmits force to the BPE housing 102 to translate the BPE housing between the deployed position and the stowed position. In some embodiments, as shown in FIG. 2, the actuator 112 is linearly oriented with the push rod 106.

The actuator 112 is in communication with or under the control of the controller 22. The actuator 112 may comprise an electric motor, an accumulator, other suitable actuator type, or any combination thereof. The actuator 112 is selectively operable according to at least a first mode and a second mode based on commands from the controller 22.

In the first mode, which may be referred to as a force feedback mode, the actuator 112 provides a return force on the push rod 106. The return force resists operator application of force via a pedal interface connected to the push rod 106 and also serves to return the pedal interface to a default position upon operator release of the pedal.

Figure 3A:
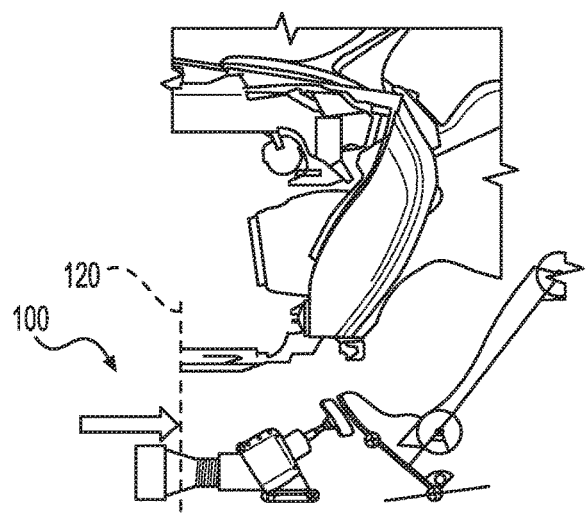
FIGS. 3A and 3B are schematic views of a vehicle, according to an embodiment.
Figure 3B:
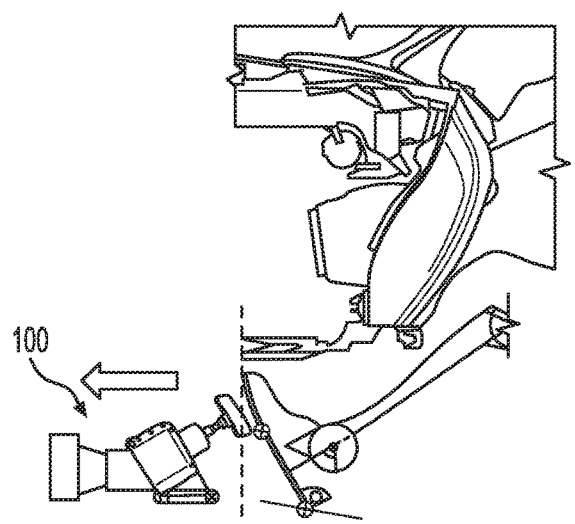

In the second mode, which may be referred to as a stowage mode, the actuator 112 provides a motive force to move the BPE housing 102 between a plurality of positions. The BPE housing 102 is slidably coupled to the rail or track 108, which is in turn coupled to an interior portion of an occupant cabin of the vehicle, as illustrated in FIGS. 3A and 3B. In the illustrated embodiment, the rail or track 108 is disposed on a floor of the cabin; however, in other embodiments the rail or track 108 may be coupled to other portions of the cabin as appropriate. In an exemplary embodiment, one or more guide members 110 may be provided between the BPE housing 102 and the rail or track 108 to facilitate relative translation therebetween.

The actuator 112 may control the threaded member 114 to rotate in a first direction to translate the housing 102 from a first position, illustrated in FIG. 3A, to a second position, illustrated in FIG. 3B, relative to a reference line 120. Similarly, the actuator 112 may control the threaded member 114 to rotate in a second direction to translate the housing 102 from the second position to the first position. The first position may be referred to as a deployed position, and the second position may be referred to as a stowed position.

Referring now to FIG. 4, a pedal assembly 200 according to a second embodiment of the present disclosure is illustrated. The pedal assembly 200 includes a BPE housing 202 coupled with a push rod 206 and a pedal interface 207.

The pedal assembly 200 is provided with an actuator 212 including a threaded portion configured to interface with a receiving member 204 of the BPE housing 202. The BPE housing 202 is coupled to at least one rail or track 208 along which the BPE housing 202 may slide. In some embodiments, a guide member 210 is coupled to the BPE housing 202 such that the guide member 210 travels along the rail or track 208 to guide a linear translation of the BPE housing 202 between a deployed position and a stowed position.

The actuator 212 is selectively operable according to a first mode and a second mode, generally similarly as discussed above with respect to the actuator 112 of FIG. 2. The actuator 212 may control a threaded member (not shown) to rotate in a first direction to translate the housing 202 from a first position, illustrated in FIG. 5A, to a second position, illustrated in FIG. 5B. Similarly, the actuator 212 may control the threaded member (not shown) to rotate in a second direction to translate the housing 202 from the second position to the first position. The first position may be referred to as a deployed position, and the second position may be referred to as a stowed position. In some embodiments, as shown in FIG. 4, the actuator 212 is orthogonally oriented with the push rod 206.

FIG. 6 illustrates a pedal assembly 300 according to a third embodiment of the present disclosure. The pedal assembly 300 includes a BPE housing 302 and a pedal arm 319, each coupled to a support member 316.

The pedal assembly 300 is provided with an actuator 312 rotatably engageable with a receiving member 304 via a threaded member. The receiving member 304 is coupled to or integrally formed with the BPE housing 302.

The pedal arm 319 has a first end and a second end opposite the first end. The pedal arm 319 is rotatably coupled to a support member 316 adjacent to the first end. The support member 316 is coupled to an interior portion of the passenger compartment of the vehicle 10. A pedal interface 307 is coupled to the pedal arm 319 at the second end. As shown in FIG. 6, a push rod 306 engages with the pedal arm 319 via a retainer 318. The retainer 318 engages with the pedal arm 319 between the first end and the second end of the pedal arm 319. The retainer 318 couples the pedal arm 319 and the push rod 306 such that force is transferred between the pedal arm 319 and the push rod 306 and vice versa. In some embodiments, the retainer 318 includes a groove configured to accommodate the pedal arm 319. The retainer 318 further includes a recess configured to accommodate an end of the push rod 306. Depression of the pedal arm 319 via the pedal interface 307 applies force to the push rod 306 via the retainer 318.

The actuator 312 is selectively operable according to a first mode and a second mode, generally similarly as discussed above with respect to the actuator 112 of FIG. 2. The actuator 312 may control a threaded member (not shown) to rotate in a first direction to translate the housing 302 from a first position, illustrated in FIG. 7A, to a second position, illustrated in FIG. 7B. Similarly, the actuator 312 may control a threaded member (not shown) to rotate in a second direction to translate the housing 302 from the second position to the first position. Translation of the housing 302 applies force to the push rod 306 to rotate the pedal arm 319 between the first position and the second position about a pivot point 320. The first position may be referred to as a deployed position, and the second position may be referred to as a stowed position. As shown in FIGS. 7A and 7B, translation of the housing 302 drives rotation of the pedal arm 319 towards the housing 302; that is, the housing 302 and the pedal arm 319 move in the same direction between a first position and the second position.

Figure 8:
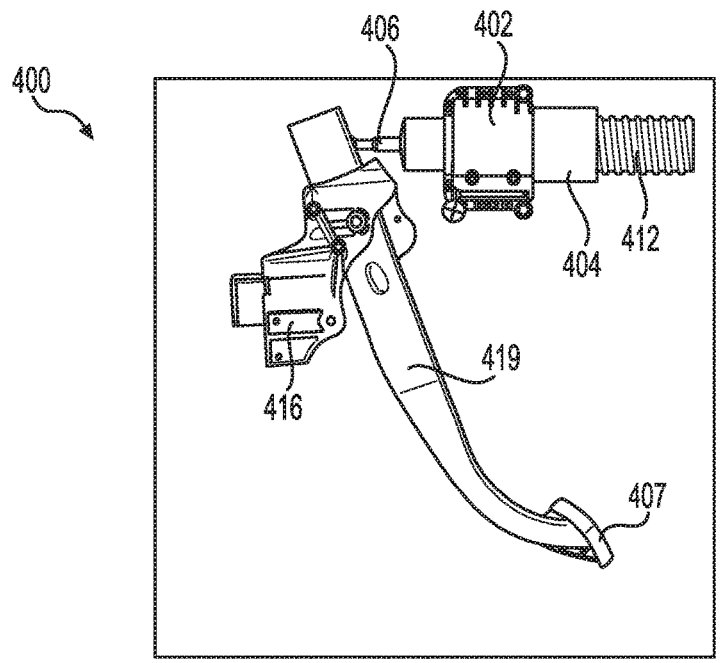
FIG. 8 is a schematic view of a pedal assembly, according to a fourth embodiment of the present disclosure.

FIG. 8 illustrates a pedal assembly 400 according to a fourth embodiment of the present disclosure. The pedal assembly 400 includes a BPE housing 402 and a pedal arm 419. The pedal arm 419 is coupled to a support member 416.

The pedal assembly 400 is provided with an actuator 412 rotatably engageable with a receiving member 404 via a threaded member. The receiving member 404 is coupled to or integrally formed with the BPE housing 402.

The pedal arm 419 has a first end and a second end opposite the first end. The pedal arm 419 is rotatably coupled to a support member 416 adjacent to the first end. The support member 416 is coupled to an interior portion of the passenger compartment of the vehicle 10. A pedal interface 407 is coupled to the pedal arm 419 at the second end. As shown in FIG. 8, a push rod 406 engages with the pedal arm 419 at the first end of the pedal arm 419. Depression of the pedal arm 419 via the pedal interface 407 applies force to the push rod 406.

Figure 9A:
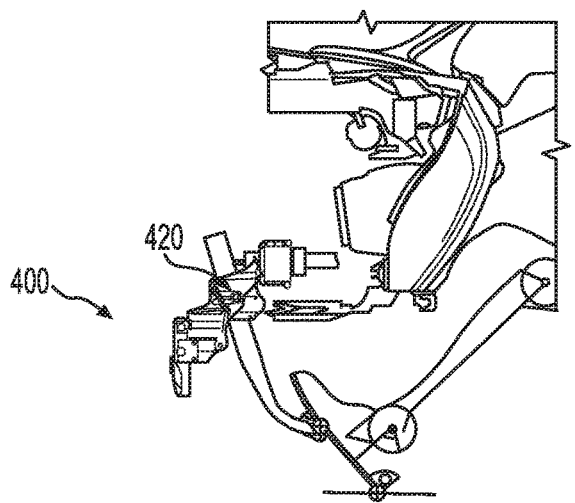
FIGS. 9A and 9B are schematic views of a vehicle, according to an embodiment.
Figure 9B:
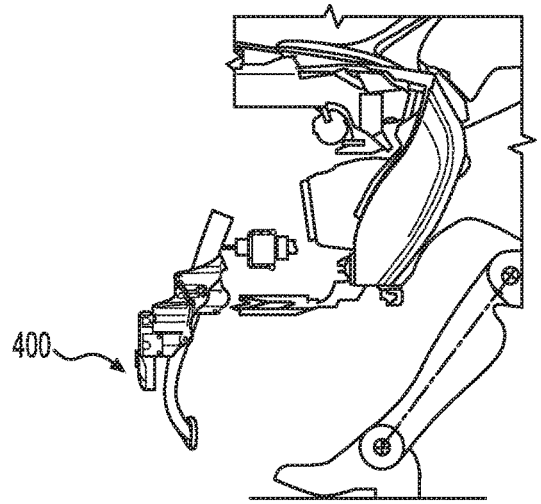

The actuator 412 is selectively operable according to a first mode and a second mode, generally similarly as discussed above with respect to the actuator 112 of FIG. 2. The actuator 412 may control the threaded member to rotate in a first direction to translate the housing 402 from a first position, illustrated in FIG. 9A, to a second position, illustrated in FIG. 9B. Similarly, the actuator 412 may control the threaded member to rotate in a second direction to translate the housing 402 from the second position to the first position. Translation of the housing 402 applies force to the push rod 406 to rotate the pedal arm 419 between the first position and the second position about a pivot point 420. The first position may be referred to as a deployed position, and the second position may be referred to as a stowed position. As shown in FIGS. 9A and 9B, translation of the housing 402 drives rotation of the pedal arm 419 away from the housing 402; that is, the housing 402 and the pedal arm 419 move in opposite directions between a first position and the second position.

Figure 10:
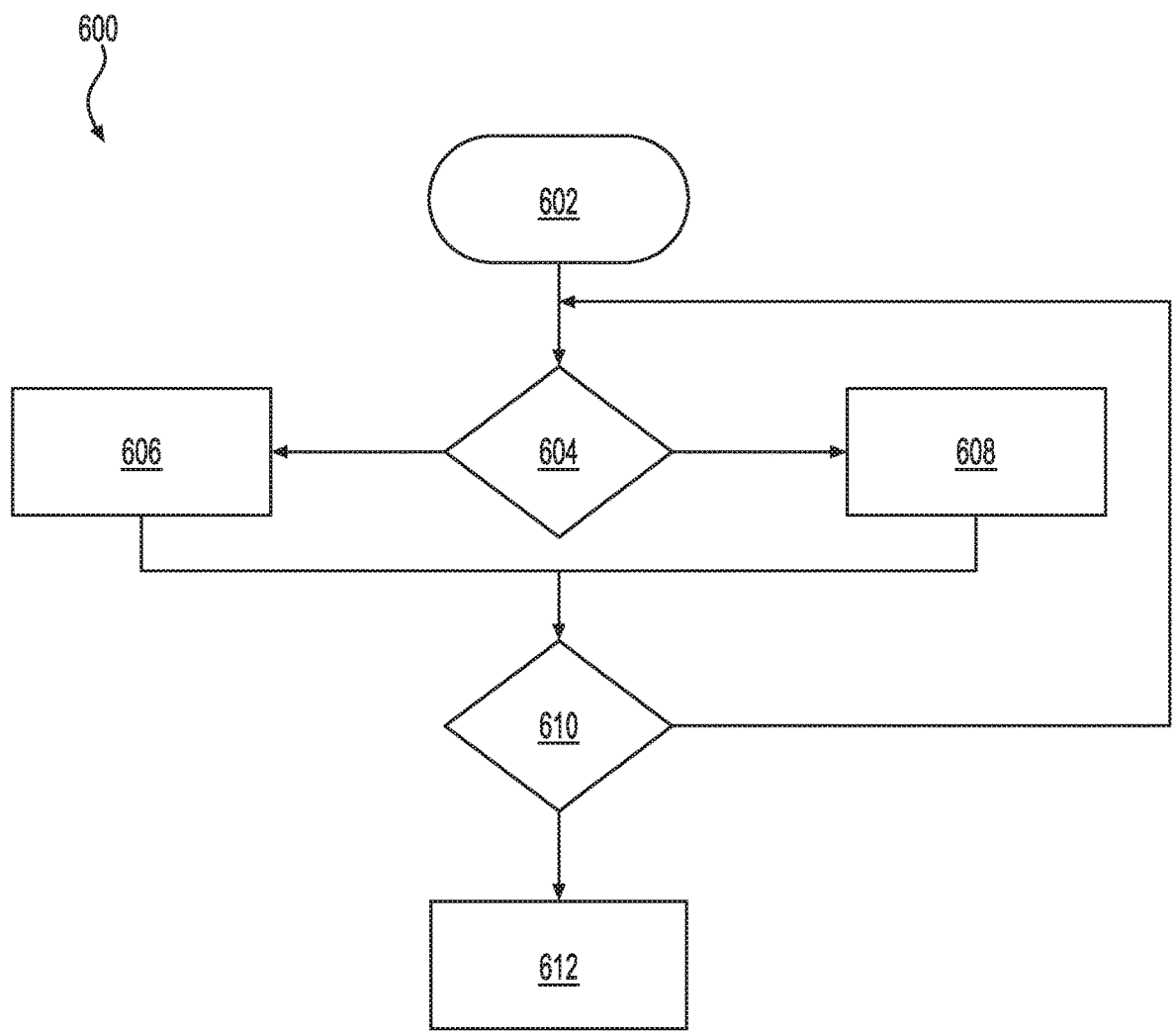
FIG. 10 is a flowchart representation of a method of controlling a vehicle, according to an embodiment.

Referring now to FIG. 10, a method 600 of controlling an automotive vehicle is illustrated in flowchart form. The method 600 can be utilized in connection with the controller 22 as discussed herein, or by other systems associated with or separate from the vehicle, in accordance with exemplary embodiments. The order of operation of the method 600 is not limited to the sequential execution as illustrated in FIG. 10, but may be performed in one or more varying orders, or steps may be performed simultaneously, as applicable in accordance with the present disclosure.

A vehicle drive cycle begins, as illustrated at block 602.

A determination is made of whether the vehicle is under the control of the ADS 24, as illustrated at operation 604. In an exemplary embodiment, this determination is made by the controller 22.

If the determination of operation 604 is positive, that is, the vehicle is under the control of the ADS 24, then the pedal assembly is controlled to a stowed position by the one or more actuators, as illustrated at block 606. This may be performed, for example, by the mechanisms and methods discussed above with respect to FIGS. 2-9.

If the determination of operation 604 is negative, that is, the vehicle is not under the control of the ADS 24, then the pedal assembly is controlled to or maintained at a deployed position, as illustrated at block 608.

Subsequent either block 606 or block 608, a determination is made of whether the drive cycle has terminated, as illustrated at operation 610. In an exemplary embodiment, this determination is made by the controller 22.

If the determination of operation 610 is negative, i.e. the drive cycle has not ended, then control returns to operation 604. The algorithm thus monitors ADS control of the vehicle and controls the pedal assembly accordingly unless and until the current drive cycle terminates.

If the determination of operation 610 is positive, i.e. the drive cycle has ended, then the pedal assembly is controlled to a default position, as illustrated at block 612. In an exemplary embodiment, the default position corresponds to the deployed position. However, in other embodiments the default position may correspond to the stowed position. The algorithm then terminates.

As may be seen the present disclosure provides a system and method for providing control interfaces to a vehicle operator when useful and moving such control interfaces out of the operator's way when unnecessary, thereby avoiding unintentional control inputs and increasing occupant comfort. Moreover, systems and methods according to the present disclosure may provide these benefits in a relatively compact package. In some embodiments, the pedal arm of the pedal assembly may be retracted to a stowed position with visual and/or other indicators provided to clearly communicate to the operator that the operator is no longer in control of the vehicle and cannot take over control via depression of the pedal arm. In some embodiments, operation of the vehicle in a manual driving mode, that is, the vehicle is not in an autonomous mode of operation and control of the vehicle is not provided by the controller, the pedal arm automatically transitions to the deployed position and a brake pedal emulator may be engaged to the pedal arm to allow pedal application by the operator.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle, comprising:
    a body having a passenger compartment;
    a pedal assembly disposed within the passenger compartment, the pedal assembly comprising a brake pedal emulator housing and at least one pedal interface coupled to the brake pedal emulator housing via a push rod, the at least one pedal interface actuatable by an occupant;
    an actuator operably and linearly coupled to the brake pedal emulator housing, the actuator being configured to selectively move the brake pedal emulator housing and the pedal interface between a first position with respect to a floor of the passenger compartment and a second position with respect to the floor of the passenger compartment, wherein the first position is closer to the floor of the passenger compartment than the second position; and
    at least one controller in communication with the actuator, the at least one controller being configured to, in response to satisfaction of a first operating condition, control the actuator to move the brake pedal emulator housing and the pedal interface to the first position, and, in response to satisfaction of a second operating condition, control the actuator to move the brake pedal emulator housing and the pedal interface to the second position wherein when the brake pedal emulator housing moves between the first and second positions the at least one pedal interface moves only linearly.

2. The automotive vehicle of claim 1 wherein the push rod is operatively coupled to the actuator, the actuator comprises a rotatable threaded member, and the brake pedal emulator housing comprises a receiving member rotationally engaged with the threaded member such that rotation of the threaded member drives translation of the brake pedal emulator housing.

3. The automotive vehicle of claim 2, wherein the actuator is orthogonally oriented with the push rod.

4. The automotive vehicle of claim 1 further comprising a rail coupled to an interior portion of the passenger compartment, the brake pedal emulator housing being slidably coupled to the rail.

5. The automotive vehicle of claim 1, wherein the first operating condition comprises an automated driving system not controlling vehicle driving behavior and wherein the second operating condition comprises the automated driving system controlling vehicle driving behavior.

6. The automotive vehicle of claim 1, wherein the first position of the pedal interface is a deployed position and the second position of the pedal interface is a stowed position.

7. A pedal assembly for a vehicle, comprising:
    a brake pedal emulator housing;
    at least one pedal interface operably coupled to the brake pedal emulator housing and actuable by an occupant by being contacted by the occupant
    a track the brake pedal emulator housing slidably coupled to the track such that a guide member disposed at a bottom of the brake pedal emulator housing below the at least one pedal interface translates within the track;
    an actuator operably coupled to the brake pedal emulator housing and configured to selectively move the brake pedal emulator housing and the at least one pedal interface between a deployed position with respect to the track and a stowed position with respect to the track, the actuator being configured to actuate the brake pedal emulator housing and the at least one pedal interface to the deployed position in response to a deploy command from a controller and to actuate the brake pedal emulator housing and the at least one pedal interface to the stowed position in response to a stow command from the controller.

8. The pedal assembly of claim 7 further comprising a push rod coupled to the at least one pedal interface and operatively coupled to the actuator, wherein the actuator comprises a rotatable threaded member and the brake pedal emulator housing comprises a receiving member rotationally engaged with the threaded member such that rotation of the threaded member drives translation of the brake pedal emulator housing.

9. The pedal assembly of claim 8, wherein the actuator is linearly oriented with the push rod.

10. The pedal assembly of claim 8, wherein the actuator is orthogonally oriented with the push rod.

11. The pedal assembly of claim 7, wherein the controller is configured to generate the deploy command in response to satisfaction of a first operating condition and to generate the stow command in response to satisfaction of a second operating condition.

12. The pedal assembly of claim 11, wherein the first operating condition comprises an automated driving system not controlling vehicle driving behavior and the second operating condition comprises the automated driving system controlling vehicle driving behavior.

13. A method of controlling an automotive vehicle, comprising:
    providing a vehicle with a first actuator configured to control vehicle acceleration or braking, a controller configured to selectively control the first actuator in an autonomous mode according to an automated driving system, a pedal assembly having a brake pedal emulator housing slidably coupled to a track such that a guide member disposed at a bottom of the brake pedal emulator housing below at least one pedal interface translates within the track the at least one pedal interface operably coupled to the brake pedal emulator housing and actuable by an occupant by being contacted by the occupant, a push rod operably coupled to the brake pedal emulator housing, and at least one pedal interface operably coupled to the push rod, and a second actuator operably and linearly coupled to the brake pedal emulator housing;

in response to the controller controlling the first actuator in the autonomous mode, automatically controlling the second actuator, via the controller, to actuate the brake pedal emulator housing and the pedal interface to a stowed position; and in response to the controller not controlling the first actuator in the autonomous mode, automatically controlling the second actuator, via the controller, to actuate the brake pedal emulator housing and the pedal interface to a deployed position.

\* \* \* \* \*